US008175907B2

(12) United States Patent
Robinson et al.

(10) Patent No.: US 8,175,907 B2
(45) Date of Patent: May 8, 2012

(54) METHOD AND SYSTEM FOR SECURED VIRTUAL RELATIONSHIP MANAGEMENT

(75) Inventors: Philip Robinson, Karlsruhe (DE);
Yuecel Karabulut, Dortmund (DE);
Jochen Haller, Karlsruhe (DE)

(73) Assignee: SAP AG, Walldorf (DE)

( * ) Notice: Subject to any disclaimer, the term of this patent is extended or adjusted under 35 U.S.C. 154(b) by 1702 days.

(21) Appl. No.: 11/253,085

(22) Filed: Oct. 17, 2005

(65) Prior Publication Data

US 2007/0088595 A1    Apr. 19, 2007

(51) Int. Cl.
*G06F 9/44*   (2006.01)
(52) U.S. Cl. ................................. 705/7.27
(58) Field of Classification Search .............. 705/9, 7.27
See application file for complete search history.

(56) References Cited

U.S. PATENT DOCUMENTS

| | | | | |
|---|---|---|---|---|
| 5,182,705 A | * | 1/1993 | Barr et al. | 705/11 |
| 6,408,337 B1 | * | 6/2002 | Dietz et al. | 709/229 |
| 6,779,721 B2 | * | 8/2004 | Larson et al. | 235/382 |
| 7,159,206 B1 | | 1/2007 | Sadhu et al. | |
| 7,176,800 B2 | * | 2/2007 | Sajkowsky | 340/572.1 |
| 7,313,812 B2 | * | 12/2007 | Robinson et al. | 726/1 |
| 2002/0052773 A1 | * | 5/2002 | Kraemer et al. | 705/9 |

OTHER PUBLICATIONS

Non-Final Office Action for U.S. Appl. No. 11/356,531 Mailed Jan. 22, 2010, 18 Pages.
Final Office Action for U.S. Appl. No. 11/356,531 Mailed Jul. 8, 2010, 16 Pages.

* cited by examiner

*Primary Examiner* — Romain Jeanty
(74) *Attorney, Agent, or Firm* — Blakely Sokoloff Taylor & Zafman, LLP

(57) ABSTRACT

A system and method to collaborate participants of different administrative domains in a workflow process is provided. The system includes a membership module for managing the participants, an event module for correlating activities of the workflow process, the membership module and the event module exchanging information relating to changes in the participants and the activities of the workflow process. The membership module for managing the participants includes registering, identifying, adding, querying and modifying the participants. On the other hand, the event module for correlating activities of the workflow process further includes specifying, executing and terminating the activities.

27 Claims, 3 Drawing Sheets

METHOD AND SYSTEM FOR SECURED VIRTUAL RELATIONSHIP MANAGEMENT

FIELD OF THE INVENTION

An embodiment relates generally to the field of workflow management system. More particularly, an embodiment relates to a system and a method for workflow management in a network-based dynamic virtual organization, such as providing specification, initialization, execution, modification and termination of workflow processes in a network-based dynamic virtual organization.

BACKGROUND OF THE INVENTION

The Internet and the World Wide Web ("Web") have changed the landscape of information delivery and affected numerous aspects of life. One benefit of this technological development is the ability to conduct business transactions globally via the Internet. As the volume of commerce conducted over the network continues to increase, collections of business units or organizations are working together to pool resources and expertise in order to achieve a common business objective. Organizations are sharing services and resources across enterprise boundaries in order to undertake collaborative projects that they could not undertake individually or to offer composed services that could not be provided by individual organizations. Virtual organizations are formed with collections of different organizations while appearing to be a single, unified organization.

A growing array of technologies has emerged to help bridge the gaps between people, time and geography in such collaborative environments or virtual organizations. In particular, Enterprise Management Systems are developed to support the administration and execution of business processes within enterprises and organizations. However, such conventional supplier management solutions fail to meet the demands of emerging multilateral collaborative application and dynamic virtual organizations where business interactions do not just occur between a single, static main buyer and multiple suppliers. In addition, the participants in virtual organizations are frequently of different administrative domains. The overall business interactions may also impose multilateral process-based interactions between the suppliers, such that a choreographed behavioral model and message exchange are required. Stated differently, the choreographed behavioral model provides a set of expected behaviors in response to event which is significantly different from a centrally controlled behavioral model. Therefore, a buyer does not control every interaction in the workflow system but initialized the workflow process with a high level definition of the interactions.

Existing supplier management solution consists of many "one-off" interactions, each of which relates to a single purchase transaction. In contrast to these interactions, a virtual organization management system consists of smaller work units in turn containing multiple complex conversations. The final output of a traditional supplier management solution is also typically a physical product, while many of the virtual organization scenarios are based on interactions between electronic services and delivery of electronic or digital products, such as design, simulation and analysis data in collaborative engineering, brokering, advice and information in integrated financial services, or real-time monitoring in collaborative supply chain management.

Based on the above observations, it is necessary to have an electronically automated means of monitoring the lifecycle and state of the overall virtual organization and not just single interaction. As a result of these ongoing conversations and interactions, there is a need to be able to specify trust, security and contracting terms before the conversations are enacted and to monitor them throughout the enactment. Furthermore, the designation of being "dynamic" indicates that both the structure of the virtual organization and the actual participation may evolve over time to accommodate changes in requirements or new opportunities in the business environment. The present invention addresses these needs.

SUMMARY OF THE INVENTION

According to one aspect of the invention, there is provided a system to collaborate participants of different administrative domains in a workflow process. The system includes a membership module for managing the participants, an event module for correlating activities of the workflow process, the membership module and the event module exchanging information relating to changes in the participants and the activities of the workflow process. The membership module for managing the participants includes registering, identifying, adding, querying and modifying the participants. On the other hand, the event module for correlating activities of the workflow process further includes specifying, executing and terminating the activities.

According to a further aspect of the invention, there is provided a method to collaborate participants of different administrative domains in a workflow process of a management system. The method includes managing the participants, correlating the activities of the workflow process, notifying the participants of the changes of the activities of the workflow process, and providing the activities of the workflow process with information update on the managing of the participants.

Other features of the present invention will be apparent from the accompanying drawings and from the detailed description that follows.

BRIEF DESCRIPTION OF THE DRAWINGS

An embodiment of the invention is illustrated by way of example and not limitation to the figures of the accompanying drawings, in which like references indicate similar elements and in which.

DETAILED DESCRIPTION

Figure 1:
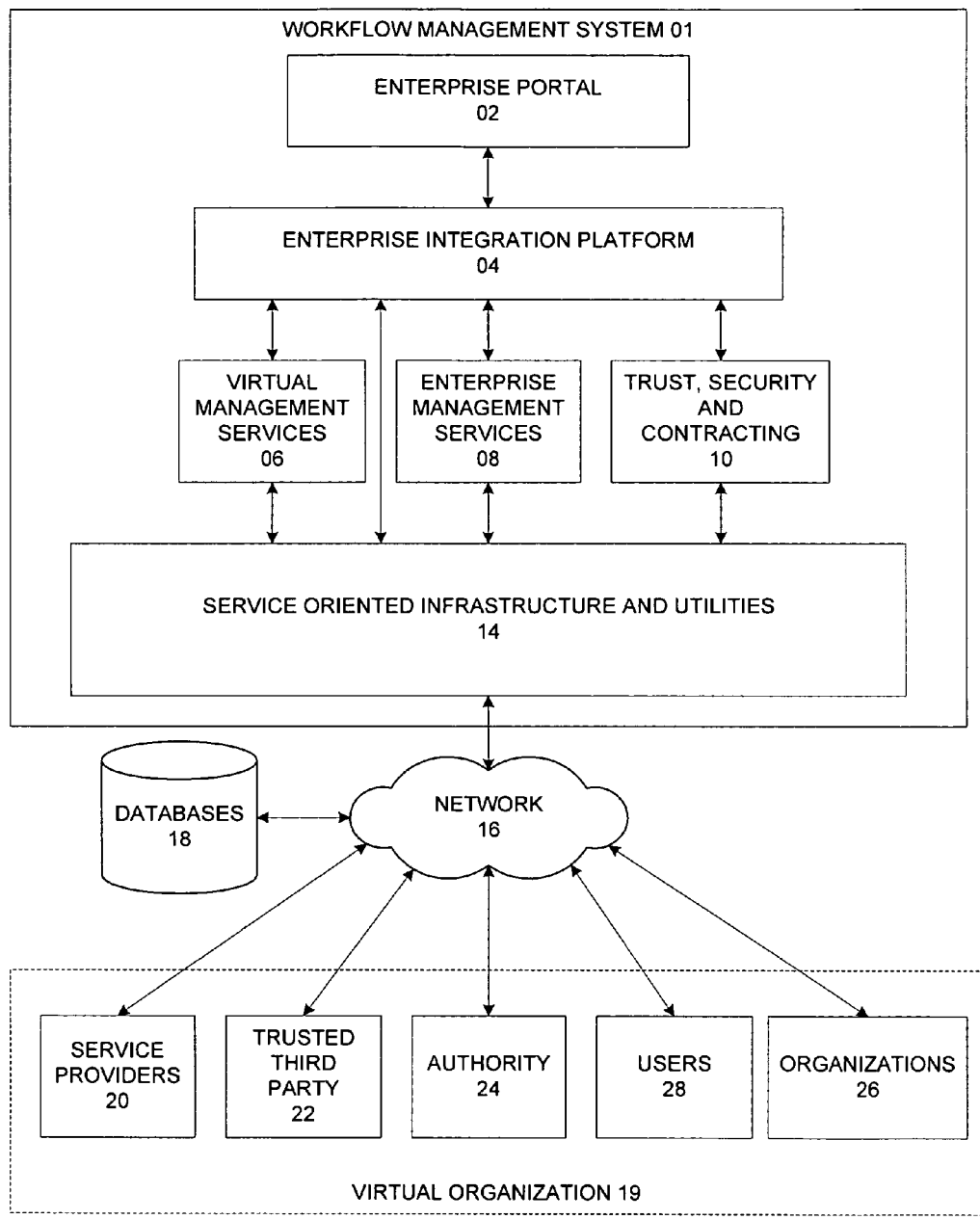
FIG. 1 is a network diagram of a workflow management system for supporting workflow process in a virtual organization in accordance with one exemplary embodiment of the invention.

Described herein is a system and method for workflow management in a network-based dynamic virtual organization. Although discussed with respect to various illustrated embodiments, the present invention is not meant to be limited thereby. Instead, these illustrations are provided to highlight various features of the present invention. The invention itself should be measured only in terms of the claims following this description.

Various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, magnetic disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

Turning now to FIG. 1, a network diagram for supporting workflow process management in a virtual organization is illustrated, according to one embodiment of the invention. The workflow management system 01 provides a collaborative platform for a virtual organization 19 that includes one or more users 28 or organizations 26 and other participants, such as, trusted third party 22, trusted authority 24 and service providers 20 via the network 16.

In one embodiment of the invention, the workflow management system 01 contains the following modules: enterprise portal 02, enterprise integration platform 04, virtual management services 06, enterprise management services 08, trust, security and contracting services 10, and service oriented infrastructure and utilities 14. Although the modules are presented as part of the workflow management system 01, some of these modules may operate as a separate entity of the workflow management system 01. For example, the enterprise portal 02 may be an independent system connected to the workflow management system 01 via network 16. In addition, in some cases, two or more of these modules may be combined into a single module, or a single module may be subdivided into multiple sub-modules. The number of modules is not critical to the invention.

The enterprise portal 02 is configured to serve as an interface for each participant (20, 22, 24, 26, 28) of the virtual organization 19 to participate in a workflow process. In particular, the enterprise portal 02 enables the virtual organization 19 to have instant, secure, and role-based access to the information and applications of the workflow process. The enterprise portal 02 is in turn connected to the enterprise integration platform 04 to allow participants of the virtual organization 19 to quickly and effectively integrate applications, systems, databases, documents, internal and external web content and collaboration tools. The enterprise integration platform 04 focuses on sharing business data and business processes among different enterprise applications. Without the enterprise integration platform 04, enterprise computing often takes the form of islands of automation where the value of individual systems is not maximized because the individual systems are working in partial or full isolation. However, if the integration is carried out without following a structured enterprise integration platform 04, many point-to-point connections grow up across the virtual organization 19. Dependent applications are added on an ad-hoc basis, resulting in a hard to maintain system. There are various approaches to implementing the Enterprise Integration platform 04, such as connecting the applications at the database level or at the user interface level.

In one embodiment of the invention, the enterprise integration platform 04 is connected to modules of virtual management services 06, enterprise management services 08, trust, security and contracting services 10, and service oriented infrastructure and utilities 14. Stated differently, the enterprise integration platform 04 manages and integrates the various services modules (06, 08, 10). This enables the various services modules to share workflow processes.

The virtual management services module 06 is configured to provide two core functionalities relating to the management of participants of the virtual organization 19 and the correlation of workflow events that indicate a state change in the workflow process. The virtual management services module 06 will be further described below with reference to FIG. 2.

The enterprise management services module 08 supports workflow process specification and execution. In particular, the workflow process specification and execution determines how workflow activities are composed and invoked. For example, a purchase order issuing activity can only be executed after the completion of a product evaluation activity.

The trust, security and contracting services module 10 manages the integrity and security of the workflow process. For example, matters relating to the trustworthiness and performance of participants of the virtual organization 19. In one embodiment, other services modules (06, 08) or participants (20, 22, 24, 26, 28) supply the trust, security and contracting services module 10 with trust parameters which are thresholds or guidelines concerning performance or reliability of the workflow process or the participants. Stated differently, the trust, security and contracting services module 10 is a knowledge-based system for consolidating trust parameters or security related information from various sources. It will be noted that the trust parameters may be of legal, business or technical nature. In addition, the trust, security and contracting services module 10 is designed to send event notifications to other services modules (06, 08) or participants (20, 22, 24, 26, 28) when a threshold or assertion of the trust parameters becomes unacceptable based on the criteria. The trust, security and contracting services module 10 may be further configured to contact trusted authority 24 or trusted third party 22 to make a trust decision or further verify a trust parameter. The trusted authority 24 may include government organizations and regulatory boards. On the other hand, trusted third party 22 may include a public or private reviewing community, such as an engineering institute who may verify the trust parameter. In addition, the trust, security and contracting services module 10 may be configured to provide security operations such as credential or security token issuing, validation and revocation.

These modules (04, 06, 08, 10) are in turn connected to the service oriented infrastructure and utilities 14, such as database, firewall and network gateway (not illustrated).

Figure 2:
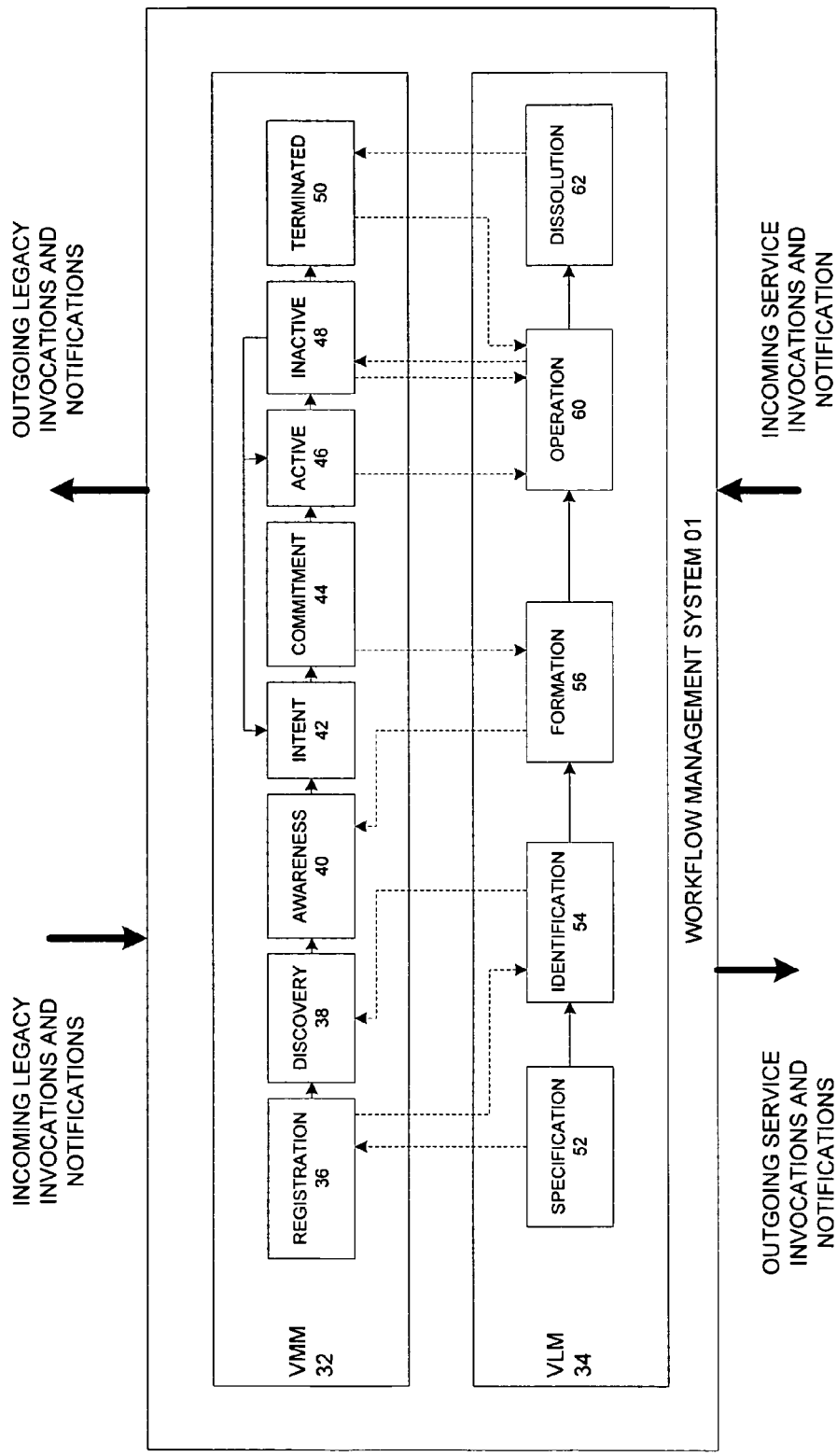
FIG. 2 is a block diagram illustrating the modules of the system for supporting workflow process management in accordance with one exemplary embodiment of the invention.

Turning to FIG. 2, the virtual organization management services module 06 is further illustrated, according to one embodiment of the invention. The virtual organizational management services module 06 has two sub-modules relating to the management of participants and the correlation of workflow events. The sub-modules are the Virtual Organizational Membership Management 32 (hereinafter "VMM") and the Virtual Organizational Lifecycle Management 34 (hereinafter "VLM") respectively.

In one embodiment of the invention, VMM 32 provides operational interface to other workflow services and applications for finding, adding, replacing, querying, modifying and removing participants in a workflow process. On the other hand, the VLM 34 provides operational interface for specifying, starting, stopping and checking the state of the workflow process or virtual organization.

In one embodiment of the invention, the VMM 32 and VLM 34 are configured as independent state machines with event-based interaction points. Stated differently, the VLM 34 operates on a model of states of a virtual organization lifecycle or the various phases of a workflow process, while the VMM 32 operates on a model of membership states. In addition, the VMM 32 and VLM 34 are configured to exchange notification, wherein the notification includes information of a change in state of the workflow process and membership which are operationally significant for each other. For example, when a participant is terminated from the workflow process (that is, a change in the state of VMM 32), the operation of the workflow event in VLM 34 may be affected. Therefore, the VMM 32 is designed to notify the VLM 34 of such events, and vice versa.

In FIG. 2, VMM 32 includes the following states or events relating to the participants: registration 36, discovery 38, awareness 40, intent 42, commitment 44, inactive 48 and terminated 50. The registration state 36 enables potential participants to be certified by one or more groups of trusted authority or third party. As described above, a trusted authority or third party may be government organizations, regulatory boards or public reviewing communities that certify the credentials or qualifications of the participants. In some cases, a trusted authority may be a certificate authority. A certificate authority is an authority in a network that issues and manages security credentials and public keys for message encryption. As part of a public key infrastructure, the certificate authority verifies information, such as qualifications, provided by the participant. The certificate authority issues a certificate to the participant if the information is valid. Depending on the public key infrastructure implementation, the certificate includes the submitted information of the participants. Hence, in the next state (the discovery state 38), the participant may be required to produce the certificate in order to participate in the workflow process.

In the discovery state 38 and awareness state 40, the initiating participant of the workflow process determines the other participants who can fulfill the activities of the workflow process. For example, the initiating participant is an airplane manufacturer seeking tire manufacturers to supply aviation flight tires with long tread-life and engine manufacturers to provide jet engines for commercial planes. The discovery state 38 and awareness state 40 enable the airplane manufacturer to distinguish an engine manufacturer providing jet engines for military planes from one providing jet engines for commercial planes.

In particular, in the discovery state 38, the initiating participant performs a search on local databases and public databases, such as databases of trusted authority, private or public network, to locate such potential participants. In the awareness state 40, the initiating participant is presented with the results of the search. In one embodiment of the invention, the potential participants may also be notified of the search and requirements of the workflow process. For example, the databases can be configured to send a notification to the potential participants, thereby informing the potential participants of a possible work opportunity. This allows the potential participants to negotiate directly with the initiator to take part in the workflow process. For example, the participants may present additional information relating to its product to the initiator.

Once the participants of the workflow process have been identified, the initiator and the participants exchange transaction documents in the intent state 42. The transition documents include invitation to quote, bidding proposal, and business terms and conditions. It will be noted that the communication of transaction documents in the intent state 42 is a set of negotiation interactions. In the next state of commitment 44, the initiator and the participants reach an agreement on how they will technically (in terms of operational binding), securely and contractually interact throughout the lifetime of the workflow process or virtual organization.

With the agreement crystallized, participants actively execute their roles to fulfill their responsibilities in the workflow process (active state 46). For example, participants respond to notifications and invocations from the initiator or other participants, following the agreed choreography.

The last two states of the VMM 32 include the inactive state 48 and the terminated state 50. The inactive state 48 signals that the performance of the participants or initiator is below the agreed threshold, such as trustworthiness threshold. In another case, the workflow process may encounter problems, such as technical or security issues, and consequently enter the inactive state 48. The workflow management system 01 may be configured to automatically terminate (termination state 50) the workflow process when the participant is performing below a certain trustworthiness threshold value. Alternatively, the workflow management system 06 is configured to alert a human administrator or the initiator of the workflow process for appropriate intervention. In the event that the problem is successfully resolved, the process may return from the inactive state 48 to the active state 46. Alternatively, the workflow management system 01 may need to reset the workflow process to the intent state 42 wherein participants and initiator may re-negotiate the agreement of the workflow process.

The last state of VMM, termination state 50, indicates the dissolution of the participants for the workflow process. For example, the workflow process may be completed, that is, all the business objectives and obligations have been met. The participants may therefore be removed from the registry. In another case, the workflow process may be severely compromised, and therefore, the need to terminate the workflow process.

Now, referring to the second module of the workflow management system 01, the VLM 34 consists of the following states: specification 52, identification 54, formation 56, operation 60 and dissolution 62. In the specification state 52, a collaboration definition of the workflow process is established. The collaboration definition includes the roles or profiles of the participants, the high-level work units, the types of collaboration and control requirements. In one embodiment of the invention, the workflow management system 01 obtains workflow definition and specification from the enterprise management services module 08 (FIG. 1) to build the collaboration definition. As described previously, the workflow process specification determines how workflow activities are composed and invoked.

In addition, the specification state 52 includes establishing the guidelines or policies governing the workflow process or the collaboration. For example, the workflow management system 01 leverages the trust, security and contracting services module 10 (FIG. 1) for such guidelines and policies.

The combination of the collaboration definition and the workflow policies produce a general workflow agreement. In one embodiment, the general workflow agreement is a data-structure that links the collaboration definitions with the specification of controls in the policies and further contains a listing of business terms and conditions. In particular, the general workflow agreement defines participant role requirements, interaction processes between the participants and policies governing the interaction processes and the activities of the workflow process, the activities including invocation, execution, and completion of the workflow process. Therefore, the general workflow agreement has business, legal and technical nature, and hence, enforceable by legal, business or technical mechanism. The general workflow agreement is referenced throughout the workflow process for derivation of service requirements inquiries, monitoring during runtime and auditing once the workflow process is dissolved.

It will be noted that the specification state 52 of VLM 34 notifies the registration state 36 of VMM 32 about the activities within the specification state 52. For example, the specification state 52 may provide the registration state 36 with the collaboration definitions or the general workflow agreement. In turn, the registration state 36 may use information in the collaboration definition or the general workflow agreement to register participants.

In the identification state 54, the requirements for identifying potential participants are established. In one embodiment of the invention, the requirements for identifying potential participants are extracted from the general workflow process agreement which contains requirements, such as relating to roles of participants and collaboration control. In addition, the registration state 36 may provide the identification state 54 with registration information relating to the participants. Similarly, the identification state 54, when established, feedbacks to the discovery state 38 the requirements of the participants and hence, facilitates the identifying of participants.

In the formation state 56 of VLM 34, participants are selected and provided with the general workflow agreement. It will be noted that the invention has the advantage of providing the participants with only the relevant parts of the general workflow agreement. For example, it may not be necessary for a product supplier to know the collaboration terms of a shipping supplier. In one example, the general workflow agreement is organized such that information is classified according to roles of participants, work units or other logical entity. This enables information to be disclosed according to certain criteria, such as the roles of the participants.

The formation state 56 works closely with the awareness state 40 and the commitment state 44 of the VMM 32. In one embodiment of the invention, the formation state 56 presents the awareness state 40 with the list of potential participants. The commitment state 44 notifies the formation state 56 of the binding conditions that are established among the participants.

The operation state 60 is the most dynamic phase of the workflow process where the collaboration definition is enacted. In the operation state 60, the VLM 34 monitors for events relating to workflow activities, active participants and security conditions. For example, the VLM 34 may receive security notifications or alerts from the trust, security and contracting services module 10 (FIG. 1). In turn, the security notifications or alerts may affect the operation state 60. For example, participants may be removed, updated or replaced. In another event whereby the workflow process is severely compromised, the operation state 60 may transit to the last state, the dissolution state 62. In addition, the change in the status of the participants in the active state 46, inactive state 48 and terminated state 50 affects the operation state 60 of the workflow process.

The dissolution state 62 is the final state of the VLM 34 whereby the business objectives of the workflow process is met or when some event invalidates the existence of the workflow process. It will be noted that in the dissolution state 62, the terminating conditions as specified in the general workflow agreement must be fulfilled. For example, the terminating conditions may require the workflow process to be audited prior to the dissolution of the workflow process. In addition, information relating to the workflow process specification, such as participants requirements and service level agreements, may be kept in database for future reference in other similar workflow process.

Figure 3:
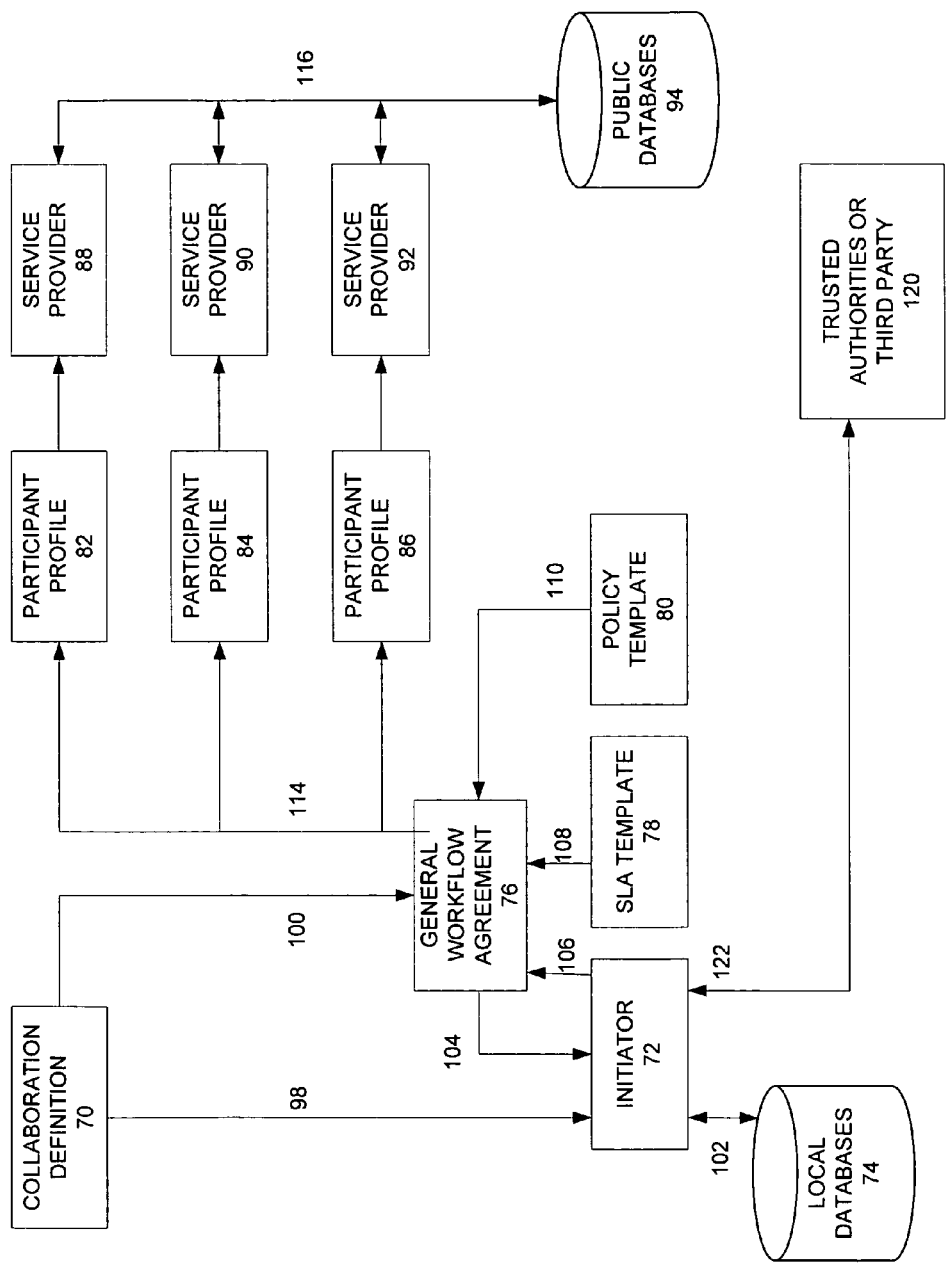
FIG. 3 is a block diagram illustrating a method for managing the workflow process in the virtual organization in accordance with one exemplary embodiment of the present invention.

FIG. 3 is an interactive block diagram illustrating a method for managing the workflow process in the virtual organization in accordance with one exemplary embodiment of the invention. In particular, FIG. 3 illustrates the various states of the VLM 34 as illustrated in FIG. 2 from the perspective of the initiating participant.

The process begins with the initiator 72 providing the collaboration definition 70 (step 98). As described above, the collaboration definition 70 includes the roles of various participants in the workflow process, the sequence of workflow process or the type of interactions between the participants. The collaboration definition 70 is further captured in a general workflow agreement 76 (step 100). In addition, the general workflow agreement 76 includes information from SLA template 78 (step 108) and policy template 80 (step 110). Although not illustrated, the SLA template 78 and policy template 80 may be independently or jointly established by the initiator 72, trusted authorities or third parties 120.

Once the general workflow agreement 76 is established, the next step includes identifying the participants in the workflow process. The initiator 72 obtains the requirements of the participants and the workflow process from the general workflow process agreement 76 (step 104). Based on the requirements, the initiator 72 performs a search at its local databases 74 (step 102) or public databases 94 (step 118) to select the participants (88, 90, 92) that best meet the requirements as specified earlier.

The selected participants 88, 90, 92 are provided with participant profile 82 which is based on the general workflow process agreement 76 (step 114). As established above, the general workflow agreement 76 contains the collaboration definition and hence, the roles and the interactions of the participants. In addition, the participants 88, 90, 92 receive information related to service level of agreement and policies governing the workflow process.

Although not illustrated, the method further includes the state of operation wherein participants are actively executing the workflow process and the state of dissolution wherein the workflow process is terminated due to completion or invalidation of the workflow process.

Thus, a system and a method for workflow management in a network-based dynamic virtual organization have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system for collaborating virtual organization participants of different administrative domains in a workflow process, the system comprising:
   a membership module for
      sending information regarding a membership state for each of the participants, the membership state related to the administrative domain of the participant,
      receiving definitions of activities of the workflow process and a lifecycle state of each of the activities, and
      managing the membership state for each of the participants with respect to the lifecycle states of the activities of the workflow process; and
   an event module for
      sending the definitions of the activities of the workflow process and the lifecycle state of each of the activities,
      receiving the information regarding the membership state of the participants,
      correlating the activities of the workflow process with respect to the membership state of each of the participants,
      detecting a change in a membership state of one of the participants that prevents completion of one of the activities of the workflow process, and
      dissolving the virtual organization in response to the detected change,
   wherein the membership module and the event module are executed via at least one processor, and the membership module and the event module dynamically exchange information relating to changes in the participants and the activities of the workflow process.

2. The system of claim 1, wherein managing the participants comprises registering, identifying, adding, querying and modifying the participants.

3. The system of claim 2, wherein registering of participants comprises validating the identities and credentials of participants by submitting the identities and credentials provided by the participants to one or more trusted authorities.

4. The system of claim 2, wherein identifying the participants comprises
   searching one or more databases containing membership information of all of the participants to locate a potential set of the participants; and
   filtering the potential set of the participants, the searching and filtering based on one or more requirements specified by an initiating participant of the workflow process or a general workflow agreement generated in the event module.

5. The system of claim 4, wherein the general workflow agreement defines participant role requirements, interaction processes between the participants and policies governing the interaction processes and the activities of the workflow process, the activities including invocation, execution, and completion of the workflow process.

6. The system of claim 2, wherein modifying the participants comprises replacing or removing the participants in response to the participants failing to perform within one or more thresholds or completion of the workflow process.

7. The system of claim 1, wherein correlating activities of the workflow process comprises specifying, executing and terminating the activities.

8. The system of claim 7, wherein specifying the activities comprises generating a general workflow agreement, the general workflow agreement to define participant role requirements, interaction processes between participants and policies governing the interaction processes and the activities of the workflow process, the activities including invocation, execution, and completion of the workflow process.

9. The system of claim 7, wherein executing the activities comprises monitoring the activities to identify trust level, compliance with security polices and progress of the workflow process.

10. A processor-executed method for collaborating virtual organization participants of different administrative domains in a workflow process, the method comprising:
   receiving information regarding a membership state for each of the participants, the membership state related to the administrative domain of the participant;
   receiving definitions of activities of the workflow process and a lifecycle state of each of the activities;
   managing the membership state for each of the participants with respect to the lifecycle states of the activities of the workflow process;

correlating the activities of the workflow process with respect to the membership state of each of the participants;

detecting a change in a membership state of one of the participants that prevents completion of one of the activities of the workflow process;

dissolving the virtual organization in response to the detected change; and notifying the participants to the dissolution of the virtual organization.

11. The method of claim 10, wherein managing the participants comprises registering, identifying, adding, querying and modifying the participants.

12. The method of claim 11, wherein registering the participants comprises validating the identities and credentials of the participants by submitting the identities and credentials provided by the participants to one or more trusted authorities.

13. The method of claim 11, wherein identifying the participants comprises performing a search on one or more databases comprising membership information of all of the participants to locate a potential set of the participants; and filtering the potential sets of the participants, the searching and filtering based on one or more requirements specified by an initiating participant of the workflow process or a general workflow agreement.

14. The method of claim 13, wherein the general workflow agreement defines participant role requirements, interaction processes between the participants and policies governing the interaction processes and the activities of the workflow process, the activities including invocation, execution, and completion of the workflow process.

15. The method of claim 11, wherein modifying the participants comprises replacing or removing the participants in response to the participants failing to perform within one or more thresholds or completion of the workflow process.

16. The method of claim 10, wherein correlating activities of the workflow process comprises specifying, executing and terminating the activities.

17. The method of claim 16, wherein specifying the activities comprises generating a general workflow agreement, the general workflow agreement to define participant role requirements, interaction processes between the participants and policies governing the interaction processes and the activities of the workflow process, the activities including invocation, execution, and completion of the workflow process.

18. The method of claim 16, wherein executing the activities comprises monitoring the activities to identify trust level, compliance with security polices and progress of the workflow process.

19. A machine-readable medium comprising instructions, which when executed by a machine, cause the machine to perform a method to collaborate virtual organization participants of different administrative domains in a workflow process, the method comprising:

receiving information regarding a membership state for each of the participants, the membership state related to the administrative domain of the participant;

receiving definitions of activities of the workflow process and a lifecycle state of each of the activities;

managing the membership state for each of the participants with respect to the lifecycle states of the activities of the workflow process;

correlating the activities of the workflow process with respect to the membership state of each of the participants;

detecting a change in a membership state of one of the participants that prevents completion of one of the activities of the workflow process;

dissolving the virtual organization in response to the detected change; and notifying the participants to the dissolution of the virtual organization.

20. The machine-readable medium of claim 19, wherein managing the participants comprises registering, identifying, adding, querying and modifying the participants.

21. The machine-readable medium of claim 20, wherein registering the participants comprises validating the identities and credentials of the participants by submitting the identities and credentials provided by the participants to one or more trusted authorities.

22. The machine-readable medium of claim 20, wherein identifying the participants comprises performing a search on one or more databases comprising membership information of all of the participants to locate a potential set of the participants; and filtering the potential sets of the participants, the searching and filtering based on one or more requirements specified by an initiating participant of the workflow process or a general workflow agreement.

23. The machine-readable medium of claim 22, wherein the general workflow agreement defines participant role requirements, interaction processes between the participants and policies governing the interaction processes and the activities of the workflow process, the activities including invocation, execution, and completion of the workflow process.

24. The machine-readable medium of claim 20, wherein modifying the participants comprises replacing or removing the participants in response to the participants failing to perform within one or more thresholds or completion of the workflow process.

25. The machine-readable medium of claim 19, wherein correlating activities of the workflow process comprises specifying, executing and terminating the activities.

26. The machine-readable medium of claim 25, wherein specifying the activities comprises generating a general workflow agreement, the general workflow agreement to define participant role requirements, interaction processes between the participants and policies governing the interaction processes and the activities of the workflow process, the activities including invocation, execution, and completion of the workflow process.

27. The machine-readable medium of claim 25, wherein executing the activities comprises monitoring the activities to identify trust level, compliance with security polices and progress of the workflow process.

* * * * *